United States Patent [19]

Milne et al.

[11] 3,835,419

[45] Sept. 10, 1974

[54] CURRENT SWITCHING FREQUENCY MODULATOR

[75] Inventors: David T. Milne, Silver Spring, Md.; David J. Plumpe, Springfield; David E. Armstrong, Alexandria, both of Va.

[73] Assignee: The United States of America as represented by the Secretary of the Navy, Washington, D.C.

[22] Filed: Apr. 18, 1973

[21] Appl. No.: 352,400

[52] U.S. Cl. ............... 332/16 R, 307/228, 307/271, 328/127, 332/9 R, 332/14, 332/18

[51] Int. Cl. ............................................. H03c 3/08

[58] Field of Search ......... 332/9 R, 9 T, 16 R, 16 T, 332/14, 18; 328/127, 136; 307/228, 271

[56] References Cited

UNITED STATES PATENTS

| | | | |
|---|---|---|---|
| 3,441,877 | 4/1969 | Thompson | 307/271 X |
| 3,482,116 | 12/1969 | James | 328/127 X |
| 3,484,593 | 12/1969 | Schmoock et al. | 328/127 X |
| 3,541,320 | 11/1970 | Beall | 328/127 X |
| 3,610,952 | 10/1971 | Chandos | 307/228 |
| 3,697,891 | 10/1972 | Shade et al. | 332/16 T X |

*Primary Examiner*—Alfred L. Brody
*Attorney, Agent, or Firm*—R. S. Sciascia; Q. E. Hodges

[57] ABSTRACT

The linear frequency modulator of the invention is comprised of a dual polarity input circuit coupled to a VCO. The VCO includes a closed loop integrator-hysteresis switch circuit which continuously oscillates to produce a square wave output from the hysteresis switch. The magnitude of the square wave is held substantially constant and fed back to the integrator. The integrator alternately produces positive and negative ramp voltages whose slopes are proportional to the substantially constant magnitude of the square wave. The hysteresis switch reverses the polarity of its output thus causing the integrator to reverse its direction of integration when the ramp voltages attain a value proportional to the substantially constant square wave magnitude. The resultant output of the integrator is a triangular wave having a center frequency which remains substantially constant as any drift of the square wave magnitude will have opposite effects on the ramp slopes and voltage value at which the ramps change direction. The dual polarity input is responsive to the square wave to add the modulating signal directly to the square wave prior to integration when the square wave is positive and to add the modulating signal with its polarity reversed to the square wave when the square wave is negative. The slopes of the triangular wave output from the integrator are thus caused to increase or decrease depending on the original polarity of the modulating signal. As the ramp switching values are held constant the frequency of the triangular wave and consequently the frequency of the square wave hysteresis switch output are caused to vary in amount proportional to the modulating signal amplitude.

17 Claims, 1 Drawing Figure

PATENTED SEP 10 1974 3,835,419
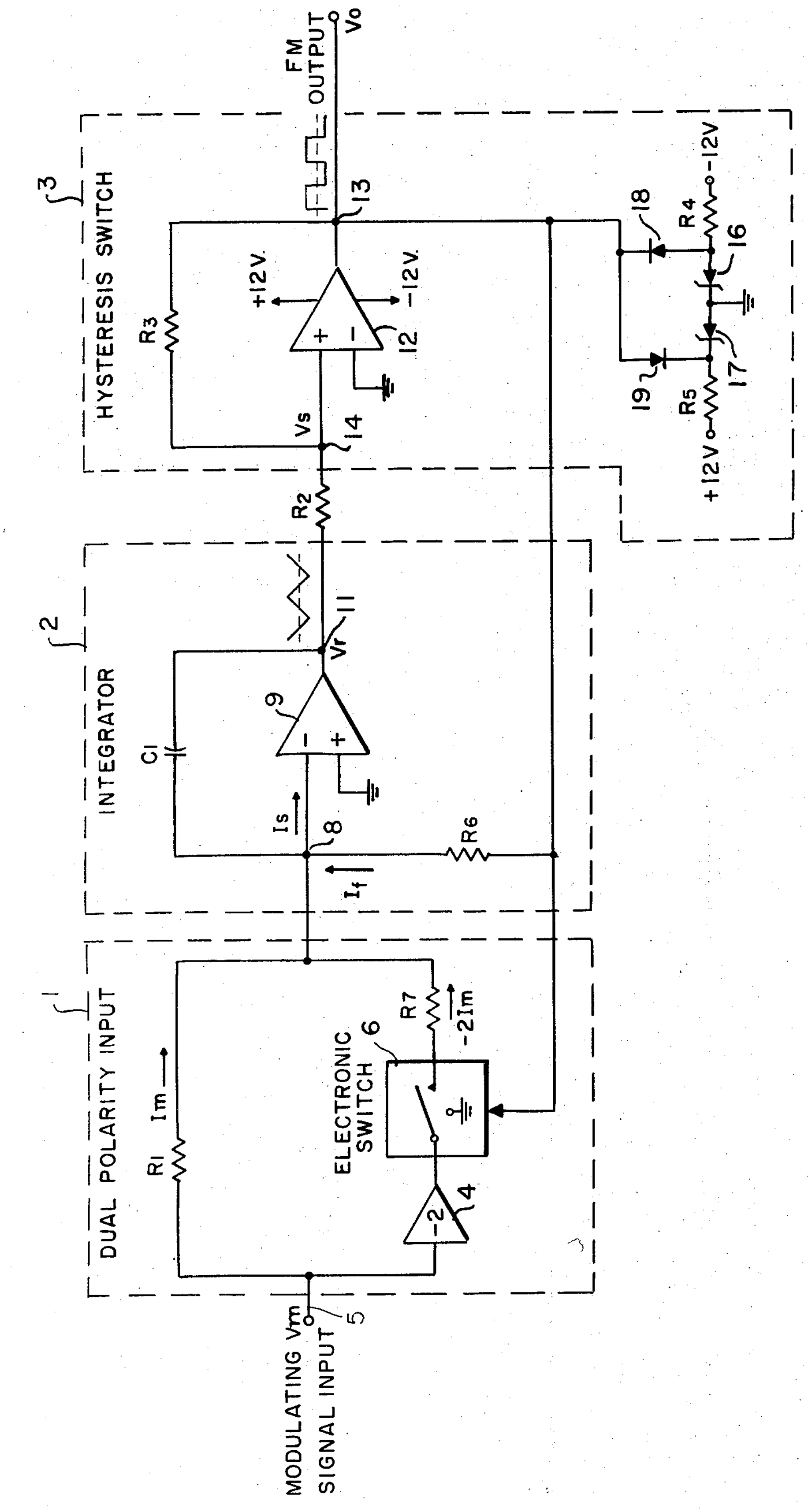

CURRENT SWITCHING FREQUENCY MODULATOR

The invention described herein may be manufactured and used by or for the Government of the United States of America for governmental purposes without the payment of any royalties thereon or therefor.

BACKGROUND OF THE INVENTION

This invention relates to linear frequency modulators. In a frequency modulator, a carrier wave is modulated so that its instantaneous frequency differs from the carrier frequency by an amount proportional to the instantaneous amplitude of the modulating wave. Implicit in frequency modulation systems is the importance of frequency stability, and in particular carrier frequency stability. For example, in a frequency modulator in which full scale deviation is 40 percent, it is clear that a 10 percent error in the carrier frequency will be transformed into a 25 percent error of full-scale modulation. In comparison, if the modulating signal error is 10 percent, only a 10 percent error would appear in the modulated output signal.

In some prior art frequency modulation systems, a modulating signal amplitude which varies about a constant d.c. value is coupled to a voltage controlled oscillator (VCO). The center frequency of the output signal is set by the d.c. value of the input signal. A disadvantage of this type of system is that there is no independent control of the center frequency. A small amount of drift or other instability introduced into the input signal to the VCO will be greatly amplified in the output signal as explained above due to the enormous effect of center frequency deviation.

In other types of prior art systems ramp generators are utilized which require fast switching to discharge an integrating capacitor prior to generating each ramp. Since a capacitor cannot be discharged in zero time, which would require infinite current, phase shift and time delay distortion are inherent in these systems. This liability severely limits the maximum useful frequency.

SUMMARY OF THE INVENTION

Accordingly, it is an object of this invention to provide a highly linear frequency modulator.

It is another object of this invention to provide a highly linear frequency modulator with improved center frequency stability.

It is another object of this invention to provide a highly linear frequency modulator of the ramp generator type wherein an integrating capacitor is caused to alternately charge in opposite directions under the same conditions to provide a symmetric triangular wave with equal plus and minus slopes.

The linear frequency modulator according to an aspect of the invention includes a voltage controlled oscillator comprising a closed loop integrator-hysteresis circuit which inherently oscillates to provide a symmetric square wave output. Each time the square wave changes polarity the input modulating signal is caused to reverse polarity. The square wave output of the hysteresis switch is fed back to the integrator where it is added to the polarity reversed modulating signal to produce an effective signal input to the integrator. The integrator operates at a rate much higher than the modulating signal frequency. This allows the integrating capacitor to charge up at the same rate that it charges down to produce a symmetric triangular wave. The hysteresis which in response to the integrator output is caused to switch from one polarity output to an equal and opposite polarity output to generate the symmetric square wave. The frequency of the square wave deviates from its center frequency by an amount proportional to the modulating signal amplitude.

These and other objects and advantages will become more clearly apparent from the following description when taken in conjunction with the accompanying drawing, in which:

The sole FIGURE in the drawing illustrates a preferred embodiment of the invention.

DESCRIPTION OF THE PREFERRED EMBODIMENT

Referring to the FIGURE the frequency modulation system includes three basic elements: a dual polarity input circuit 1, an integrating circuit 2, and an hysteresis switch 3. The integrating circuit 2 and hysteresis switch 3 are in a closed loop arrangement and together form a voltage controlled oscillator (VCO). The frequency of the output signal is a function of the summing point current $I_s$ which is the sum of the input current $I_m$ and the feedback current $I_f$. When $I_m$=0, i.e., when the modulating signal voltage is zero, the output frequency is solely a function of the feedback current $I_f$. Thus, in the absence of a modulating signal, the VCO oscillates continuously at a predetermined center frequency.

The dual polarity input circuit 1 includes two channels with a common input coupled to the modulating signal $V_m$ received on input line 5. One channel continuously provides a current $I_m$ via resistor $R_1$. The other channel includes an amplifier 4 having a precise gain of minus two followed by an electronic switch 6 responsive to the output of the hysteresis switch 3 for alternately switching a current $-2I_m$ through resistor $R_7$ and to ground, respectively. The currents from the two channels are supplied to current summing point 8. The resultant current, then, from dual polarity input circuit 1 is either $+I_m$ or $-I_m$.

The integration circuit 2 comprises a high speed, high gain, operational amplifier 9 with a capacitor $C_1$ in a negative feedback arrangement coupling output terminal 11 with input summing terminal 8. Characteristically, operational amplifier 9 operates in response to the net current $I_s$ supplied to input terminal 8 (which is at virtual ground) to produce an integrated output signal at terminal 11. The net current $I_s$ is the effective input to amplifier 9 and is proportional to the sum of the voltages $V_m$ and $V_0$. The integrator output is of opposite polarity relative to the effective input signal and has a magnitude proportional to the time integral of the effective input signal.

The integrator 2 operating at a very high rate, assumes that for any one carrier cycle the summing point current $I_s$ is constant and thus produces a ramp signal at its output. The slope of the ramp at 11 is proportional to the summing point current $I_s$ and the period of integration is inversely proportional to the summing point current $I_s$.

The hysteresis switch is a two state switching device which includes a high speed, high gain operational amplifier 12 coupled to amplifier 9 via resistor $R_2$. Resistor $R_3$ couples positive feedback from terminal 13 to terminal 14. The input impedance of amplifier 12 is infinite for all practical purposes. Terminal 14, then, sums the integrator ramp voltage $V_r$ and feedback voltage $V_o$ to provide summing voltage $V_s$. In response to zero crossings of $V_s$, amplifier 12 tends to saturate to either the positive or negative supply voltage, depending on the direction of the zero cross. The output of amplifier 12 is clamped to equal positive and negative voltages by means of two temperature compensated zener reference diodes 16 and 17. The two zener diodes are biased via two resistors $R_4$ and $R_5$ of equal value to plus and minus voltage supplies, respectively. Two matched signal diodes 18 and 19 alternately connect amplifier 12 to the zener reference voltages. The hysteresis switch output voltage is tapped to provide feedback current $I_f$ through resistor $R_6$ which feeds current to summing point 8 and also controls the operation of electronic switch 6.

The frequency modulator operates as follows: Assume first that the modulating signal voltage $V_m$ is zero. By nature of its operation, amplifier 12 is always saturated in one direction or the other. To begin with, assume it is saturated to the positive voltage supply, which in the drawing is +12 volts. Voltage supplies are subject to instability and drift for a variety of reasons. To eliminate this instability, the output of amplifier 12 is clamped to a precise voltage by the zener diodes as previously discussed. Assume that the zener voltages are plus and minus 6 volts, respectively. Current $I_f$, proportional to the clamped voltage, is fed back through resistor $R_6$ to summing input terminal 8 of integrating amplifier 9. Capacitor $C_1$ begins charging in the negative direction to produce a negatively sloped ramp voltage $V_r$ at output terminal 11. Through the resistor network $R_2$, $R_3$ this negative ramp $V_r$ is compared with the positive clamped feedback voltage $V_o$, where $V_s = (V_r R_3 + V_o R_2)/(R_2 + R_3)$. When the negative ramp contribution $V_r R_3/R_2{+}R_3$ exceeds the positive feedback voltage contribution $V_o R_2/R_2{+}R_3$, $V_s$ will pass through zero in the negative direction thereby causing amplifier 12 to switch and tend to saturate to the negative voltage supply. The values of resistors $R_2$ and $R_3$ determine the switching points of amplifier 12 and are adjusted to keep amplifier 9 in the linear range. Zener diode 16 will clamp the output of amplifier 12 at −6 volts. In response, capacitor $C_1$ in the integration circuit will begin to charge positively so as to reverse the direction of the voltage ramp $V_r$. As before, amplifier 12 will reverse the polarity of its saturation when $V_s$ crosses zero. This will occur when the now positive ramp contribution $V_r R_3/(R_2{+}R_3)$ exceeds the now negative feedback voltage contribution $(V_o R_2)/(R_2{+}R_3)$. Diode 17 will similarly clamp the output of amplifier 12 at +6 volts. It should now be apparent that the above operation is repetitive and that the periodic switching of the hysteresis switch between its positive and negative states results in a square wave output.

Various aspects of the above operation are worth noting. First, the positive and negative states of the hysteresis switch are controlled to be substantially equal and opposite in polarity by zener diodes 16 and 17. This allows the integrator to integrate under the same conditions in both the positive and negative directions to produce a symmetric triangular wave with equal plus and minus slopes. Thus there is no problem of quickly discharging a capacitor, as the integrating capacitor $C_1$ in this invention charges up and down at the same rate.

A second aspect worth noting is that the ramp output of the integrator is compared at summing point 14 with the precisely controlled positive and negative levels of the hysteresis switch output voltage $V_o$. This permits amplifier 12, which is essentially a comparator, to switch states at precisely the same magnitude of ramp voltage $V_r$ every time. So not only are the plus and minus slopes of the triangular wave the same, but the durations of each ramp are also equal (in the absence of modulation). Therefore, the switching frequency of hysteresis switch 3, and hence the frequency of the square wave output, is inversely proportional to the period of the triangular wave. Since the period of the triangular wave is inversely proportional to the magnitude of the integrator input signal, the square wave frequency is directly and linearly proportional to the input signal magnitude.

A third important operational aspect is that there is a double check on the center frequency stability. The first check, already discussed, is due to the fact that the two levels of the feedback signal, $I_f$ to the integrating circuit 2 are held substantially equal and opposite in polarity by the voltage clamp on the output of amplifier 12. However, for example, should the clamped voltage level drift slightly up due to, say, aging of the zener diodes, which would normally tend to increase the center frequency, it should be clear that while the slopes of the integrator ramp output may increase, the period of integration, i.e., duration of each ramp, will remain the same. This is because the contribution of the comparison or switching voltage $V_o$ to the summing voltage $V_s$ will have simultaneously increased permitting the hysteresis switch 3 to switch at a higher level on the ramp voltage $V_r$. This higher level of ramp voltage $V_r$ is proportional to the increase in slope of $V_r$ caused by the increase in $V_o$. Thus, the center frequency is held substantially constant. This self-compensating aspect of the invention creates a highly stable center frequency and consequently a highly stable frequency modulator.

Now, suppose that the modulating signal input is other than zero, say for example +1 volt. When the hysteresis switch output is positive at 6 volts (using the prior example) the electronic switch 6 is caused to be grounded. Current $I_m$ is added to $I_f$ at summing point 8 and time integrated to produce a more steeply sloped negative ramp. When the hysteresis switch output is negative, the electronic switch is caused to be closed so as to pass $-2I_m$. The currents from both channels of dual polarity input circuit 1 are added at summing point 8 to provide a net current from the dual polarity input of $-I_m$. The current $-I_m$ is added to the now negative feedback current $-I_f$ and time integrated to produce a more steeply sloped positive ramp at the integrator output.

Since the slopes of the up and down integrator voltage ramp have increased, the integration period has decreased because the ramps are reaching the switching voltage level more quickly. Concomitantly, the switching frequency of hysteresis switch 3, and hence the square wave output frequency, has increased. The deviation of the square wave frequency from the center frequency is, clearly, linearly proportional to the magnitude of the modulating signal input. Of course, if the modulating signal in the example were negative, the resulting square wave frequency would have decreased because of the net decrease in current at summing input terminal 8.

It will be understood that various changes in the details, materials, steps and arrangements of parts, which have been herein described and illustrated in order to explain the nature of the invention, may be made by those skilled in the art within the principle and scope of the invention as expressed in the claims.

What is claimed is:

1. A linear frequency modulator comprising:
a first input means for receiving a first electrical signal input, said first signal being a modulating signal;
a second input means for receiving a second electrical signal input, said second signal being a signal of substantially constant magnitude;
summing means coupled to said first and second input means for summing said first and second signal inputs to produce an effective signal input;
means responsive to said effective signal input for producing a square wave, said square wave having positive and negative states of equal magnitude;
feedback means coupling said square wave to said second input means, said square wave being said second signal input of substantially constant magnitude, and wherein the center frequency of said square wave is directly proportional to said magnitude;
dual polarity input means coupled between said first input means and said summing means and being responsive to said square wave for directly inputting said modulating signal to said summing means when said square wave is positive in amplitude, and for reversing the polarity of said modulating signal input to said summing means when said square wave is negative in amplitude;
wherein the frequency of said square wave is caused to deviate from said center frequency by an amount linearly proportional to the amplitude of said modulating signal.

2. The modulator of claim 1 wherein said responsive means includes:
integrating means coupled to said summing means and responsive to said effective signal input for producing a ramp voltage output with positive slope when said effective signal is negative and a ramp voltage output with negative slop when said effective signal is positive; slope
hysteresis switch means responsive to said ramp signal outputs for producing said positive state of said square wave when said negative ramp signal attains a first value and for producing said negative state of said square wave when said positive ramp signal attains a second value;
whereby said effective signal input to said integrating means changes polarity in correspondence with the change in polarity of said square wave.

3. The modulator of claim 2 wherein:
said first and second values are linearly proportional to said substantially constant magnitude of said square wave output of said hysteresis switch means;
said integrating means being responsive to said polarity changes of said effective input signal for reversing its direction of integration to produce a symmetric triangular wave having equal plus and minus slopes which are linearly proportional to said substantially constant magnitude of said square wave output of said hysteresis switch, said triangular wave and consequently said square wave having a center frequency which thereby remains substantially constant.

4. The modulator of claim 2 wherein said integrating means includes:
an operational amplifier having an input and an output;
a capacitor coupled between said input and said output of said amplifier in a negative feedback arrangement.

5. The modulator of claim 2 wherein said hysteresis switch means includes:
an operational amplifier having an input and an output;
a first resistor coupled between said input and said output of said amplifier in a positive feedback arrangement;
a second resistor coupled between said input of said amplifier and the output of said integrating means;
said first and second resistors having a common junction at said amplifier input for summing said integrator ramp output and said amplifier output to produce a sum voltage at said amplifier input.

6. The modulator of claim 5 wherein:
said amplifier is responsive to zero crossings of said sum voltage at said amplifier input to tend to saturate positively when said zero crossing is in the positive direction and to tend to saturate negatively when said zero crossing is in the negative direction;
said hysteresis switch means further including voltage clamp means coupled to said amplifier output for clamping said amplifier output at said substantially constant magnitude.

7. The modulator of claim 6 wherein said voltage clamp means includes:
two temperature compensated zener diodes, said diodes being oppositely poled and coupled between said amplifier output and ground.

8. The modulator of claim 1 wherein said dual polarity input includes:
a first resistive channel coupled between said first input means and said summing means for passing a current to said summing means proportional to and of the same polarity as said modulating signal;
a second channel comprising an amplifier having a gain of minus two coupled to said first input means, an electronic switch coupled to said amplifier, said summing means and said means for producing said square wave, said electronic switch being responsive to said square wave to ground the signal output of said gain of minus two amplifier when said square wave is positive and to pass a current to said summing means proportional to minus two times said modulating signal when said square wave is negative.

9. A linear frequency modulator including:
a hysteresis switch means having an output, said output comprising a stable positive state and a stable negative state, said states being substantially constant in magnitude;

an inverting integrating means coupled to the output of said switch means for integrating said switch output to provide a ramp signal having a slope proportional to said switch output magnitude and opposite in polarity;

said hysteresis switch means being coupled to the output of said integrating means and responsive to said ramp signal for switching states each time said ramp signal attains a certain switching magnitude, said switching magnitude being proportional to said switch output magnitude and thereby also proportional to said ramp slope;

the resulting time output of said integrating means being a triangular wave and the resulting time output of said switch means being a square wave;

said hysteresis switch and said integrating means including self compensation means for causing the frequency of said triangular wave to be substantially independent of any variations in the magnitude of its input from the hysteresis switch output and for causing said square wave to have a substantially stable center frequency;

modulating signal input means for receiving a modulating signal coupled to said hysteresis switch means output;

means for combining the output signal from said modulating signal input means with the output signal from said hysteresis switch means and then inputting said combined signal to said integrating means for proportionately varying the period of integration of said ramp signal;

wherein the switching frequency of said hysteresis switch and hence the frequency of said square wave output is caused to deviate from said center frequency by an amount linearly proportional to the amplitude of said modulating signal.

10. The modulator of claim 9 wherein said modulating signal input means comprises:

a dual polarity input means responsive to said square wave for directly passing said modulating signal to said combining means when said square wave is positive and for passing said modulating signal with its polarity reversed to said combining means when said square wave is negative.

11. The modulator of claim 10 wherein said dual polarity input includes:

a first channel resistively coupling said modulating signal to said combining means; and a second channel comprising an amplifier having a gain of minus two, and an electronic switch, the input of said amplifier coupled to said modulating signal and the output of said amplifier coupled to said combining means via said electronic switch, said electronic switch being responsive to said square wave for passing said modulating signal times minus two to said combining means when said wave is negative and for grounding said modulating signal times minus two when said square wave is positive.

12. The modulator of claim 9 wherein said integrating means comprises:

an operational amplifier; and a capacitor connecting the input and output of said amplifier in a negative feedback arrangement.

13. The modulator of claim 12 wherein said combining means comprises a current summing junction at the negative input of said operational amplifier.

14. The modulator of claim 9 wherein said hysteresis switch means includes an operational amplifier;

said self compensating means includes a first resistor connecting the input and output of said amplifier in a positive feedback arrangement;

a second resistor coupled between said integrating means and said amplifier input;

said first and second resistors having a common junction at said amplifier input for summing said integrator ramp signal and said amplifier output signal to produce a sum signal at said amplifier input.

15. The modulator of claim 14, wherein:

said amplifier is responsive to zero crossings of said sum signal at said amplifier input to tend to saturate positively when said zero crossing is in the positive direction and to tend to saturate negatively when said zero crossing is in the negative direction.

16. The modulator of claim 15, wherein said hysteresis switch further includes:

voltage clamp means coupled to said amplifier output for clamping said amplifier output states at desired positive and negative amplitudes.

17. The modulator of claim 16, wherein said voltage clamp means includes:

two temperature compensated diodes, said diodes being oppositely poled and coupled between said amplifier output and ground.

* * * * *

UNITED STATES PATENT OFFICE

CERTIFICATE OF CORRECTION

Patent No. 3,835,419 Dated September 10, 1974

Inventor(s) David T. Milne, David J. Plumpe and David R. Armstrong

It is certified that error appears in the above-identified patent and that said Letters Patent are hereby corrected as shown below:

"[75] David T. Milne, Silver Spring, Md.; David J. Plumpe, Springfield; David R. Armstrong, Alexandria, both of Va."

Signed and sealed this 31st day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334